United States Patent
Kawai et al.

(10) Patent No.: US 10,207,482 B2
(45) Date of Patent: Feb. 19, 2019

(54) RESIN COMPOSITION, MULTILAYER STRUCTURE, AND THERMOFORMED CONTAINER INCLUDING THE SAME

(71) Applicant: KURARAY CO., LTD., Kurashiki-shi (JP)

(72) Inventors: Hiroshi Kawai, Kurashiki (JP); Shogo Nakazawa, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 185 days.

(21) Appl. No.: 15/026,446

(22) PCT Filed: Oct. 2, 2014

(86) PCT No.: PCT/JP2014/076419
§ 371 (c)(1),
(2) Date: Mar. 31, 2016

(87) PCT Pub. No.: WO2015/050211
PCT Pub. Date: Apr. 9, 2015

(65) Prior Publication Data
US 2016/0221313 A1   Aug. 4, 2016

(30) Foreign Application Priority Data

Oct. 3, 2013   (JP) ................. 2013-208567
Oct. 3, 2013   (JP) ................. 2013-208568
Oct. 3, 2013   (JP) ................. 2013-208569

(51) Int. Cl.
| | |
|---|---|
| C08L 23/06 | (2006.01) |
| B32B 27/32 | (2006.01) |
| B32B 27/18 | (2006.01) |
| C08L 23/08 | (2006.01) |
| B32B 27/08 | (2006.01) |
| B32B 27/30 | (2006.01) |
| C08K 5/07 | (2006.01) |
| B29K 23/00 | (2006.01) |
| B29C 49/00 | (2006.01) |
| B29C 51/00 | (2006.01) |

(52) U.S. Cl.
CPC .............. *B32B 27/32* (2013.01); *B32B 27/08* (2013.01); *B32B 27/18* (2013.01); *B32B 27/306* (2013.01); *C08L 23/06* (2013.01); *C08L 23/0861* (2013.01); *B29C 49/0005* (2013.01); *B29C 51/002* (2013.01); *B29K 2023/083* (2013.01); *B32B 2307/558* (2013.01); *B32B 2307/738* (2013.01); *B32B 2439/00* (2013.01); *B32B 2439/60* (2013.01); *C08K 5/07* (2013.01); *C08L 2201/08* (2013.01); *C08L 2203/30* (2013.01); *C08L 2205/06* (2013.01); *C08L 2207/062* (2013.01)

(58) Field of Classification Search
CPC .................................. C08K 5/07; C08L 29/04
See application file for complete search history.

(56) References Cited

U.S. PATENT DOCUMENTS

| | | |
|---|---|---|
| 2006/0047040 A1 | 3/2006 | Shida et al. |
| 2008/0003390 A1 | 1/2008 | Hayashi et al. |
| 2012/0009431 A1 | 1/2012 | Kazeto |
| 2013/0225756 A1 | 8/2013 | Igarashi et al. |

FOREIGN PATENT DOCUMENTS

| | | |
|---|---|---|
| CN | 1184827 A | 6/1998 |
| CN | 1280912 A | 1/2001 |
| CN | 101006130 A | 7/2007 |
| CN | 102803378 A | 11/2012 |
| CN | 105722760 A | 6/2016 |
| EP | 3 048 058 A1 | 7/2016 |
| JP | 3-72542 A | 3/1991 |
| JP | 5-179001 A | 7/1993 |
| JP | 2001-348017 A | 12/2001 |
| JP | 2007-31725 A | 2/2007 |
| JP | 2009-242645 A | 10/2009 |
| JP | 2010-77352 A | 4/2010 |
| WO | 2005/014716 A1 | 2/2005 |
| WO | 2005/105437 A1 | 11/2005 |
| WO | 2006/022256 A1 | 3/2006 |
| WO | 2012/060371 A1 | 5/2012 |
| WO | 2013/146962 A1 | 10/2013 |

OTHER PUBLICATIONS

Machine translation of JP 2010077352. (Year: 2010).*
International Search Report dated Dec. 16, 2014 in PCT/JP2014/076419 filed on Oct. 2, 2014.
European Patent Office dated Dec. 5, 2018, in European Patent Application No. 14850975.5.

* cited by examiner

*Primary Examiner* — Wenwen Cai
(74) *Attorney, Agent, or Firm* — Oblon, McClelland, Maier & Neustadt, L.L.P.

(57) ABSTRACT

Provided is a resin composition exhibiting inhibited generation of defects in thermoforming, and having a superior appearance and sufficient strength. Also provided are a multilayer structure and a thermoformed container that exhibit superior appearance characteristics and impact resistance even when a recovered material obtained by repeatedly recovering a remnant, a scrap and the like of a sheet containing the resin composition is used. The resin composition contains: an ethylene-vinyl alcohol copolymer (A); a polyolefin (B); and a carbonyl compound (C) having 3 to 8 carbon atoms. The carbonyl compound (C) is an unsaturated aldehyde (C-1), a saturated aldehyde (C-2), a saturated ketone (C-3) or a combination thereof, and the content of the carbonyl compound (C) is 0.01 ppm or greater and 100 ppm or less.

13 Claims, No Drawings

RESIN COMPOSITION, MULTILAYER STRUCTURE, AND THERMOFORMED CONTAINER INCLUDING THE SAME

CROSS-REFERENCE TO RELATED APPLICATIONS

This application is a National Stage of PCT/JP2014/076419, which was filed on Oct. 2, 2014. This application is based upon and claims the benefit of priority to Japanese Application No. 2013-208567, which was filed on Oct. 3, 2013, and to Japanese Application No. 2013-208567, which was filed on Oct. 3, 2013, and to Japanese Application No. 2013-208569, which was filed on Oct. 3, 2013.

TECHNICAL FIELD

The present invention relates to an ethylene-vinyl alcohol copolymer, a resin composition containing a polyolefin and a specific carbonyl compound, a multilayer structure having at least one layer formed of the resin composition, as well as a thermoformed container including the multilayer structure, and a production method of the thermoformed container.

BACKGROUND ART

Ethylene-vinyl alcohol copolymers (hereinafter, may be abbreviated as "EVOH(s)") have been widely used as a material that is moldable through melting and superior in gas barrier properties. For example, EVOHs have been used as a material for films and sheets to be formed by melt molding. EVOH layers constituted with the sheet and the like have been used as a packaging material after being laminated on a thermoplastic resin layer containing a polyolefin-derived resin, etc. as a principal component. Such a packaging material including the EVOH layer may be thermoformed and thereafter utilized as a packaging container. Since the packaging container is superior in oxygen barrier properties due to including the EVOH layer, the packaging container has been widely used in intended usages in which superior oxygen barrier properties are demanded, for example, in fields of foods, cosmetics, medical drugs, chemicals, and toiletries. In this regard, remnants, defective products and/or the like generated in the production of the various types of molded articles may be recovered, subjected to melt molding, and recycled as at least one layer of a multilayer structure including a polyolefin layer and an EVOH layer. Such a recovery technique is useful and extensively adopted in light of a waste reduction and an economical efficiency.

However, in the recycling of the recovered material of the multilayer structure including the polyolefin layer and the EVOH layer, gelation that occurs due to heat deterioration of the material during melt molding, and adhesion of a deteriorated matter to the inside wall of an extruder have made continuous melt molding over a long time period difficult. In addition, such an adhesion of the deteriorated matter to the inside wall of the extruder is disadvantageous in that the roughness of the surface of the resulting molded article is likely to generated. Furthermore, these drawbacks become significant with the repetition of the recycling of the recovered material from the multilayer structure.

To address such drawbacks, for example, Patent Document 1 discloses a resin composition that contains: a polyolefin; an ethylene-vinyl acetate copolymer saponified product having an ethylene percentage content of 20 to 65 mol % and a degree of saponification of a vinyl acetate component of 96 mol % or greater; at least one compound selected from a higher fatty acid metal salt having 8 to 22 carbon atoms, an ethylenediaminetetraacetic acid metal salt and hydrotalcite; and an ethylene-vinyl acetate copolymer saponified product having an ethylene percentage content of 68 to 98 mol % and a degree of saponification of a vinyl acetate component of 20% or greater. Furthermore, it is disclosed that salts of higher fatty acids such as lauric acid, stearic acid and myristic acid with a metal such as calcium, magnesium or zinc are suitable as the higher fatty acid metal salt having 8 to 22 carbon atoms. This resin composition reportedly has superior compatibility, and the molded article obtained by using the resin composition reportedly has no wave pattern on the surface thereof, leading to a superior appearance. However, the resin composition disclosed in Examples of Patent Document 1 and containing calcium stearate may generate a substance adhering to a screw, and as a result, the resulting molded article may have a rough surface.

Patent Document 2 discloses a production method of a fuel container, characterized in that the fuel container has a reground layer (recovery layer) containing ground matter of a laminate, and the laminate has: an intermediate layer that contains an ethylene-vinyl acetate copolymer saponified product having an ethylene content of 10 to 60 mol % and a degree of saponification of a vinyl acetate component of 95 mol % or greater and containing at least one selected from magnesium, calcium and zinc in a proportion of 10 to 500 ppm; and a thermoplastic resin laminated at least on both sides as the outermost layer. In this method, the intermediate layer of the laminate used for the reground layer contains an ethylene-vinyl acetate copolymer saponified product with which a fatty acid metal salt is blended. At least one selected from a magnesium salt, a calcium salt and a zinc salt is used as the fatty acid metal salt. Moreover, a lower fatty acid and/or a higher fatty acid are/is used as the fatty acid. According to the production method, a fuel container that is superior in melt formability, mechanical characteristics and the like is reportedly obtained. However, when zinc stearate is blended in an amount as disclosed in Examples of Patent Document 2, there still remain drawbacks that deteriorated matter is likely to adhere to a screw during the melt molding of the laminate, and the resulting molded article is likely to have a rough surface.

Furthermore, the techniques disclosed in the documents described above are still unsatisfactory in light of molding defects generated in the case of multiple recycling of the recovered material as well as the inhibition of the deterioration of the impact resistance caused by the molding defects.

In addition, a production method of EVOH has been known in which crotonaldehyde is coexisted in addition to ethylene and vinyl acetate in a polymerization step to produce the EVOH (see Patent Document 3). According to this production method, an adhesion of scales in the interior of a polymerization tank can be inhibited by the coexistence of crotonaldehyde during the polymerization. As a result, films of the EVOH produced by this production method, generation of fish eyes resulting from the scales detached and mixed into the polymer can be reportedly decreased.

However, crotonaldehyde added in the polymerization is partially consumed in the polymerization step and a saponification step. In addition, crotonaldehyde has a solubility in water of as high as 18.1 g/100 g (20° C.) (The MERCK INDEX 14th 2006). On the other hand, the production method of EVOH typically includes the step of washing away sodium acetate produced in the neutralization after the saponification with water. Thus, crotonaldehyde added in the polymerization is substantially completely eliminated in the washing step during the production of EVOH, and thus hardly remains in a product such as an EVOH film. Therefore, according to the production method described above, the effects of the addition of the unsaturated aldehyde on an improvement of thermal stability and properties for operation for a long time period (long-run workability) in the thermoforming, and the like are unknown.

As described above, according to the conventional resin compositions and production methods, it is difficult to improve an unfavorable appearance and inhibit the deterioration of the impact resistance when the recovery and recycling of the resin compositions is repeated multiple times.

PRIOR ART DOCUMENTS

Patent Documents

Patent Document 1: Japanese Unexamined Patent Application, Publication No. H3-72542
Patent Document 2: Japanese Unexamined Patent Application, Publication No. 2001-348017
Patent Document 3: Japanese Unexamined Patent Application, Publication No. 2007-31725

SUMMARY OF THE INVENTION

Problems to be Solved by the Invention

An object of the present invention is to provide a resin composition and a thermoformed container that exhibit inhibited generation of defects in the thermoforming and have a superior appearance and sufficient strength. Furthermore, another object of the present invention is to provide a production method that enables a thermoformed container having the characteristics described above to be provided, and achieves superior long-run workability. In addition, when a recovered material obtained by repeatedly recovering a remnant, a scrap and the like of the sheet containing the resin composition is used as a layer of a multilayer structure, heat deterioration and/or aggregation of the EVOH in the recovered material would not occur, the compatibility with other thermoplastic resin would not be deteriorated, and the deterioration of the impact resistance of the resulting multilayered container would be inhibited.

Means for Solving the Problems

According to an aspect of the invention made for solving the aforementioned problems, a resin composition contains: an ethylene-vinyl alcohol copolymer (A) (hereinafter, may be also referred to as "EVOH (A)"); a polyolefin (B) (hereinafter, may be also referred to as "PO (B)"); and a carbonyl compound (C) having 3 to 8 carbon atoms, wherein the carbonyl compound (C) is an unsaturated aldehyde (C-1), a saturated aldehyde (C-2), a saturated ketone (C-3) or a combination thereof, and wherein the content of the carbonyl compound (C) is 0.01 ppm or greater and 100 ppm or less.

Due to containing the components (A) to (C), the resin composition according to the aspect of the present invention can effectively inhibit the generation of burnt deposits in a thermoforming apparatus even in the case of an operation of the apparatus over a long time period, leading to an extension of a time period of a continuous operation. Moreover, even in a case where a remnant, a scrap and the like of the sheet containing the resin composition is repeatedly recovered and recycled, a multilayered container that is superior in impact resistance can be provided. Although the reasons for the achievement of the aforementioned effects by the resin composition are not necessarily clarified, it can be inferred, for example, that since the EVOH (A), the PO (B) and the carbonyl compound (C) are contained in each specified content, the effects resulting from the incorporation of each component would be synergistically exhibited, and consequently an extension of a time period of a continuous operation can be achieved.

The unsaturated aldehyde (C-1) is preferably an unsaturated aliphatic aldehyde. The unsaturated aliphatic aldehyde is preferably at least one selected from the group consisting of crotonaldehyde, 2,4-hexadienal and 2,4,6-octatrienal. The saturated aldehyde (C-2) is preferably at least one selected from the group consisting of propanal, butanal and hexanal. The saturated ketone (C-3) is preferably at least one selected from the group consisting of acetone, methyl ethyl ketone and 2-hexanone. The thermoformed container obtained by using the resin composition has a superior appearance and has sufficient strength due to the EVOH layer (A) containing the specified substance(s) as the carbonyl compound (C). Furthermore, when the carbonyl compound (C) is contained in an amount less than the lower limit, deterioration of the impact resistance of the multilayered container obtained during a continuous operation over a long time period may not be inhibited. On the other hand, when the content of the carbonyl compound (C) is greater than the upper limit, condensation of molecules of the carbonyl compound (C) as well as reactions of a condensate molecule of the carbonyl compound (C) with the EVOH may occur and an increase of the viscosity may be caused, resulting in aggregation of the EVOH. As a result, the impact resistance may be deteriorated.

The resin composition may further contain an acid-modified polyolefin. When the acid-modified polyolefin is added to the resin composition, aggregation of the EVOH (A) in the resin composition in microdomains may be inhibited.

The resin composition may further contain a fatty acid metal salt. The incorporation of the fatty acid metal salt is preferred since a multilayer structure and a thermoformed container that are superior in appearance characteristics and mechanical strength (impact resistance) can be produced.

The multilayer structure has a layer formed of the resin composition and a layer formed of other component. The multilayer structure having the layer formed of the resin composition and the layer formed of other component is preferred since the multilayer structure exhibits favorable appearance characteristics and impact resistance.

According to the multilayer structure, the layer formed of other component preferably includes a layer formed of the ethylene-vinyl alcohol copolymer (A) and a layer formed of the polyolefin (B). When the layer formed from the resin composition having the aforementioned characteristics and the layer formed of other component are included, superior appearance characteristics, impact resistance, processing characteristics, and economical efficiency are exhibited.

According to another aspect of the present invention, a thermoformed container preferably includes the multilayer structure. The thermoformed container is preferably a blow-molded product. It is preferred that the thermoformed container is produced through the step of thermoforming the multilayer structure, and it is preferred that the thermoforming is blow-molding. When the multilayer structure is formed by the thermoforming, in particular, the blow-molding, superior appearance characteristics and impact resistance are exhibited.

Effects of the Invention

As explained in the foregoing, due to containing the EVOH (A), the PO (B) and the carbonyl compound (C), the resin composition according to the aspect of the present invention provides the thermoformed container that exhibits inhibited generation of defects in the thermoforming and has a superior appearance and sufficient strength. Furthermore, according to still another aspect of the present invention a production method is provided which enables a thermoformed container having the characteristics described above to be provided, and achieves superior long-run workability. In addition, even when a recovered material obtained by repeatedly recovering a remnant, a scrap and the like of the sheet containing the resin composition is used, the heat deterioration of the EVOH in the recovered material can be inhibited and the compatibility with the PO can be maintained or improved, whereby a multilayer structure and a thermoformed container that are superior in appearance characteristics and mechanical strength (impact resistance) can be produced. Due to having superior appearance characteristics, impact resistance and processing characteristics, the resin composition and the multilayer structure are suitable as a molding material for various types of thermoformed containers such as bottles, cups, trays and fuel containers as well as packaging materials.

DESCRIPTION OF EMBODIMENTS

Hereinafter, embodiments of the present invention will be described. However, the present invention is by no means limited to the following embodiments. In addition, with respect to materials exemplified in the following, one type of the materials may be used alone, or two or more types thereof may be used in combination, unless otherwise specified particularly.

Resin Composition

The resin composition according to an embodiment of the present invention contains the EVOH (A), the PO (B), and the carbonyl compound (C), in which the content of the carbonyl compound (C) is 0.01 ppm or greater and 100 ppm or less with respect to the resin composition. As used herein, "ppm" as referred to herein means a mass proportion of a pertinent component in the entire resin composition, and 1 ppm means 0.0001% by mass. The resin composition may contain as an optional component, a boron compound, a phosphorus compound, an aliphatic carboxylic acid, an antioxidant, an UV absorbent, a plasticizer, an antistatic agent, a lubricant, a colorant, a filler, a heat stabilizer, a hydrotalcite compound, or the like, within a range not leading to impairment of the effects of the present invention. Hereinafter, each component will be described.

EVOH (A)

The EVOH (A) is an ethylene-vinyl alcohol copolymer obtained by saponifying a copolymer of ethylene and a vinyl ester.

The vinyl ester is exemplified by vinyl acetate, vinyl propionate, vinyl pivalate, and the like, and vinyl acetate is preferred. These vinyl esters may be used either alone, or two or more types thereof may be used in combination.

The EVOH (A) may have other structural unit derived from a monomer other than the ethylene unit and the vinyl ester unit. Such a monomer is exemplified by polymerizable compounds, e.g.: vinylsilane compounds; unsaturated hydrocarbons such as propylene and butylene; unsaturated carboxylic acids such as (meth)acrylic acid; vinylpyrrolidones such as N-vinylpyrrolidone; and the like. The content of the other structural unit is preferably 0.0002 mol % or greater and 0.2 mol % or less with respect to the total structural units of the EVOH (A).

The ethylene unit content of the EVOH (A) is typically 20 mol % or greater and 60 mol % or less, preferably 24 mol % or greater and 55 mol % or less, more preferably 27 mol % or greater and 45 mol % or less, still more preferably 27 mol % or greater and 42 mol % or less, and particularly preferably 27 mol % or greater and 38 mol % or less. When the ethylene content is less than 20 mol %, thermal stability in the melt extrusion may be deteriorated, leading to ease of gelation, and consequently defects such as streaks and fish eyes are likely to be generated. In particular, when an operation is made under conditions involving a higher temperature or a higher speed than those for general melt extrusion for a long time period, the gelation is highly likely to occur. On the other hand, when the ethylene content is greater than 60 mol %, the gas barrier properties, and the like may be deteriorated, and the advantageous characteristics of the EVOH (A) may not be sufficiently exhibited.

The degree of saponification of the structural units derived from the vinyl ester in the EVOH (A) is 80% or greater, preferably 85% or greater, more preferably 90% or greater more, more preferably 95 mol %, still more preferably 98% or greater, and particularly preferably 99% or greater. When the degree of saponification is less than 85%, insufficient thermal stability may be caused.

Polyolefin (PO) (B)

Examples of the polyolefin (B) used in the present invention include: polyethylenes (low-density, linear low-density, medium-density, high-density and the like); ethylene-based copolymers obtained by copolymerizing ethylene with α-olefins such as 1-butene, 1-hexene or 4-methyl-1-pentene, or with an acrylic acid ester; polypropylenes; propylene-based copolymers obtained by copolymerizing propylene with α-olefins such as ethylene, 1-butene, 1-hexene or 4-methyl-1-pentene; modified polyolefins obtained by reacting poly(1-butene), poly(4-methyl-1-pentene), the aforementioned polyethylenes, ethylene-based copolymers, polypropylenes, propylene-based copolymers, poly(1-butene) or poly(4-methyl-1-pentene) with maleic anhydride; ionomer resins; and the like. Of these, polypropylene-based resins such as polypropylenes and propylene-based copolymers, or polyethylene-based resins such as polyethylenes and ethylene-based copolymers are preferred. The polyolefin (B) may be used either alone of one type, or as a mixture of two or more thereof. In particular, in a case where the multilayer structure including a layer formed of the resin composition according to the embodiment of the present invention is used as a food packaging material, a polyethylene-based resin is preferably used in light of superior secondary processability.

The proportions of the EVOH (A) and the PO (B) in the resin composition according to the embodiment of the present invention is preferably in a range of 0.1 to 99.9% by mass for the EVOH (A) and a range of 0.1 to 99.9% by mass for the PO (B). In light of the impact strength of the multilayered container, the content of the EVOH (A) is more preferably 30% by mass or less, and still more preferably 10% by mass or less.

Carbonyl Compound (C)

The resin composition contains the carbonyl compound (C) as an essential component. The resin composition containing the carbonyl compound (C) can inhibit occurrence of defects such as gelation (dirt under paint) and streaks caused on melt molding, leading to superior appearance characteristics.

The carbonyl compound (C) is an unsaturated aldehyde (C-1), a saturated aldehyde (C-2), a saturated ketone (C-3) or a combination thereof.

The unsaturated aldehyde (C-1) as referred to herein means an aldehyde that has a carbon-carbon double bond or a carbon-carbon triple bond in a molecule thereof. Examples of the unsaturated aldehyde (C-1) include e.g., unsaturated aliphatic aldehydes:

aldehydes having a carbon-carbon double bond in a molecule thereof such as acrolein, crotonaldehyde, methacrolein, 2-methylbutenal, 2-hexenal, 2,6-nonadienal, 2,4-hexadienal, 2,4,6-octatrienal, 5-methyl-2-hexenal, cyclopentenylaldehyde and cyclohexenylaldehyde;

aldehydes having a carbon-carbon triple bond such as propiolaldehyde, 2-butyn-1-al and 2-pentyn-1-al; and the like.

Of these, the unsaturated aldehyde (C-1) is preferably an unsaturated aliphatic aldehyde, more preferably an aldehyde having a carbon-carbon double bond in a molecule thereof, still more preferably crotonaldehyde, 2,4-hexadienal, 2,4,6-octatrienal. Among these, crotonaldehyde having a boiling point of about 100° C. and having a high solubility in water is particularly preferred because of ease in eliminating an excess, or supplying a shortage as needed in a washing step and/or a drying step, for example. The unsaturated aldehyde (C-1) has preferably 3 to 10 carbon atoms, more preferably 4 to 8 carbon atoms, and still more preferably 4, 6 or 8 carbon atoms, including the carbon atom of the aldehyde moiety.

The saturated aldehyde (C-2) as referred to means an aldehyde that does not include an unsaturated bond in a moiety other than the aldehyde group in a molecule thereof. The saturated aldehyde (C-2) may be a linear aldehyde, a branched aldehyde, or an aldehyde having a ring structure in its molecule as long as the saturated aldehyde (C-2) does not include an unsaturated bond in the moiety other than the aldehyde group. The saturated aldehyde (C-2) may have one, or two or more aldehyde groups in a molecule thereof.

The saturated aldehyde (C-2) is exemplified by a saturated aliphatic aldehyde and the like. Examples of the saturated aliphatic aldehyde include propanal, butanal, pentanal, hexanal, heptanal, octanal, cyclohexanecarbaldehyde, cyclopentanecarbaldehyde, methylcyclohexanecarbaldehyde, methylcyclopentanecarbaldehyde, and the like.

The lower limit of the number of carbon atoms of the saturated aldehyde (C-2) is preferably 3 in light of an improvement of the solubility of the saturated aldehyde (C-2) in water. Moreover, the upper limit of the number of carbon atoms of the saturated aldehyde (C-2) is preferably 50, more preferably 15, and still more preferably 8 in light of an improvement of the solubility of the saturated aldehyde (C-2) in water. In light of the inhibition of the coloring and the generation of the defects due to the melt molding, and an improvement of the long-run workability, the saturated aldehyde (C-2) is preferably a saturated aliphatic aldehyde, more preferably propanal, butanal, hexanal or a combination thereof, and still more preferably propanal, among the saturated aldehydes exemplified.

The saturated ketone (C-3) as referred to means a ketone that does not include an unsaturated bond in a moiety other than the carbonyl group in a molecule thereof. The saturated ketone (C-3) may be a linear ketone, a branched ketone, or a ketone having a ring structure in a molecule as long as the saturated ketone (C-3) does not include an unsaturated bond in the moiety other than the carbonyl group. The saturated ketone (C-3) may have one, or two or more carbonyl groups in a molecule thereof.

The saturated ketone (C-3) is exemplified by a saturated aliphatic ketone, a saturated cyclic ketone, and the like. Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3 heptanone, 4-heptanone, 4-methyl-2-hexanone, 5-methyl-2-hexanone, 2,4-dimethyl-3-pentanone, 2-octanone, 3-methyl-2-heptanone, 5-methyl-3-heptanone, 3-octanone, 6-methyl-2-heptanone, methyl cyclopentyl ketone, methyl cyclohexyl ketone, and the like. Examples of the saturated cyclic ketone include cyclobutanone, cyclopentanone, cyclohexanone, cycloheptanone, cyclooctanone, and the like.

The lower limit of the number of carbon atoms of the saturated ketone (C-3) is preferably 3 in light of an improvement of the solubility of the saturated ketone (C-3) in water. Moreover, the upper limit of the number of carbon atoms of the saturated ketone (C-3) is preferably 50, more preferably 15, and still more preferably 8. In light of the inhibition of the coloring and the generation of the defects due to the melt molding and an improvement of the long-run workability, the saturated ketone (C-3) is preferably a saturated aliphatic ketone, more preferably acetone, methyl ethyl ketone, 2-hexanone or a combination thereof, and still more preferably acetone, among the saturated ketones exemplified.

A part or all of hydrogen atoms included in the carbonyl compound (C) (except for the hydrogen atoms of the aldehyde group of the unsaturated aldehyde (C-1) and the saturated aldehyde (C-2)) may be substituted with a substituent within a range not leading to impairment of the effects of the present invention. The substituent is exemplified by a halogen atom, a hydroxy group, an amino group, an amide group, a cyano group, and the like.

The lower limit of the content of the carbonyl compound (C) in the resin composition is 0.01 ppm, preferably 0.05 ppm, and more preferably 0.1 ppm. On the other hand, the upper limit of the content of the carbonyl compound (C) is 100 ppm, and preferably 50 ppm. When the content of the carbonyl compound (C) is less than the lower limit, the inhibition of a time-dependent increase of the occurrence of the gelation in melt molding may be insufficient. On the other hand, when the content of the carbonyl compound (C) is greater than the upper limit, the condensation of molecules of the carbonyl compound as well as the crosslinking of an EVOH molecule with a condensate molecule of the molecules of the carbonyl compound may occur during melt molding. Consequently, the generation of the fish eyes and the streaks may be induced, and the coloring of a multilayer structure constituted with a resin composition is also likely to occur.

The resin composition exhibits a favorable effect of inhibiting an increase of the viscosity due to heat deterioration of the EVOH (A), in particular, even in a case where a recovered material obtained by repeatedly recovering a remnant, a scrap and the like of the sheet containing the resin composition is used. Specifically, the addition of the carbonyl compound (C) to the resin composition containing the polyolefin (B) along with the EVOH exerts the effect that the dispersibility of the EVOH in the case of the use of the repeatedly recovered composition is improved and consequently the impairment of the mechanical strength, i.e. impact resistance of the resulting molded article is inhibited.

Acid-Modified Polyolefin

When added to the resin composition, the acid-modified polyolefin inhibits aggregation of the EVOH (A) in the resin composition in microdomains.

The acid-modified polyolefin is exemplified by an olefin-derived polymer having an unsaturated carboxylic acid or derivatives thereof introduced thereinto through a chemical bond, and specific examples include: maleic anhydride graft-modified polyolefins such as maleic anhydride graft-modified polyethylenes and maleic anhydride graft-modified polypropylenes; maleic anhydride graft-modified copolymers of an olefin with a vinyl monomer, such as maleic anhydride graft-modified ethylene-propylene (block or random) copolymers, maleic anhydride graft-modified ethylene-ethyl acrylate copolymers, and maleic anhydride graft-modified ethylene-vinyl acetate copolymers. These olefin-derived polymers may be used either alone of one type, or in combination of two or more types thereof.

The amount of the acid-modified polyolefin is preferably 1% by mass to 20% by mass, more preferably 3% by mass to 15% by mass, and still more preferably 5% by mass to 10% by mass with respect to the resin composition.

Fatty Acid Metal Salt

When the fatty acid metal salt is added to the resin composition, a multilayer structure and a thermoformed container that are superior in appearance characteristics and mechanical strength (impact resistance) can be produced.

The fatty acid metal salt is exemplified by a salt of a higher fatty acid having 10 to 26 carbon atoms, such as lauric acid, stearic acid, myristic acid, behenic acid or montanic acid, with a metal, in particular, a salt thereof with a metal in group 1, group 2 or group 3 in periodic table, e.g., a sodium salt, a potassium salt, a calcium salt and a magnesium salt. Alternatively, zinc salts of the fatty acids described above may be used. Of these, the salt of the metal in group 2 in periodic table, such as the calcium salt and the magnesium salt is preferred.

The content of the fatty acid metal salt in the resin composition is preferably 50 ppm or greater and 10,000 ppm or less, more preferably 100 ppm or greater and 8,000 ppm or less, still more preferably 150 ppm or greater and 5,000 ppm or less, and particularly preferably 200 ppm or greater and 4,000 ppm or less with respect to the resin composition.

Optional Component

The resin composition may contain a boron compound, a phosphorus compound, an aliphatic carboxylic acid, a conjugated polyene compound, an antioxidant, an CV absorbent, a plasticizer, an antistatic agent, a lubricant, a colorant, a filler, a hydrotalcite compound, or the like. The resin composition may contain two or more types of these components. The total content of these optional components is preferably 1% by mass or less with respect to the resin composition.

Boron Compound

The boron compound inhibits gelation in the melt molding, and additionally inhibits a torque fluctuation of an extrusion molding machine or the like, i.e., a variation of a viscosity during heating. Examples of the boron compound include boric acids such as orthoboric acid, metaboric acid and tetraboric acid; boric acid esters such as triethyl borate and trimethyl borate; boric acid salts such as alkali metal salts and alkaline earth metal salts of the aforementioned boric acids, and borax; boron hydrides; and the like. Of these, boric acids are preferred, and orthoboric acid (hereinafter, may be also referred to as "boric acid") are more preferred. The lower limit of the content of the boron compound in the resin composition is preferably 100 ppm, and more preferably 150 ppm. The upper limit of the content of the boron compound is preferably 5,000 ppm, more preferably 4,000 ppm, and still more preferably 3,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and consequently the appearance of the multilayer structure and the thermoformed container may be deteriorated.

Phosphorus Compound

The phosphorus compound inhibits the coloring and the generation of defects such as streaks and fish eyes, and additionally improves the long-run workability. Examples of the phosphorus compound include various types of phosphoric acids such as phosphoric acid and phosphorous acid, phosphates, and the like. The phosphate may be in any form of a monobasic phosphate salt, a dibasic phosphate salt and a tribasic phosphate salt. In addition, the cationic species contained in the phosphate is not particularly limited. The phosphate is preferably an alkali metal salt or an alkaline earth metal salt, more preferably sodium dihydrogen phosphate, potassium dihydrogen phosphate, disodium hydrogen phosphate or dipotassium hydrogen phosphate, and still more preferably sodium dihydrogen phosphate or dipotassium hydrogen phosphate.

Aliphatic Carboxylic Acid

An aliphatic carboxylic acid may be added in addition to the fatty acid metal salt described above. The aliphatic carboxylic acid is preferably a saturated aliphatic carboxylic acid having 1 to 26 carbon atoms, more preferably a saturated aliphatic carboxylic acid having 1 to 12 carbon atoms, still more preferably a saturated aliphatic carboxylic acid having 1 to 9 carbon atoms, and particularly preferably acetic acid. The content of the aliphatic carboxylic acid is preferably 50 ppm or greater and 10,000 ppm or less, more preferably 100 ppm or greater and 8,000 ppm or less, still more preferably 150 ppm or greater and 5,000 ppm or less, and particularly preferably 200 ppm or greater and 4,000 ppm or less. When the content of the aliphatic carboxylic acid is less than 50 ppm, sufficient coloring preventive effects may not be achieved, and consequently yellowing may be found in a molded article formed from the resin composition. According to the resin composition, in a case where the content of the aliphatic carboxylic acid is greater than 10,000 ppm, when melt molding is carried out, and in particular, when the melt molding is carried out for a long time period, gelation is likely to occur, and consequently the appearance of the molded article may be unfavorable.

Conjugated Polyene Compound

The conjugated polyene compound inhibits oxidative degradation in melt molding. The "conjugated polyene compound" as referred to herein means a compound having a conjugated double bond, as generally referred to, i.e., a compound having two or more carbon-carbon double bonds and having a structure in which a carbon-carbon double bond and a carbon-carbon single bond are alternately connected. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a plurality of number in a single molecule without being conjugated with one another. For example, compounds having three conjugated triene structures in a single molecule, such as tung oil, may also be included in the conjugated polyene compound.

The conjugated polyene compound preferably has 7 or less conjugated double bonds. When the resin composition contains a conjugated polyene compound having 8 or more conjugated double bonds, coloring of the multilayer structure, and, in turn, the thermoformed container is highly likely to occur.

The conjugated polyene compound (III) may be used either alone, or two or more types thereof may be used in combination. The conjugated polyene compound has preferably 4 to 30 carbon atoms, and more preferably 4 to 10 carbon atoms. Among the exemplified conjugated diene compounds, sorbic acid, a sorbic acid ester, a sorbic acid salt (sodium sorbate, potassium sorbate, and the like), myrcene or a mixture of two or more of these is preferred, and sorbic acid, a sorbic acid salt or a mixture of any of these is more preferred. Sorbic acid, a sorbic acid salt and a mixture thereof exhibit superior inhibitory effects on oxidative degradation at high temperatures, and are preferred also in light of hygienic properties and availability since they are industrially used broadly also as food additives. The molecular weight of the conjugated polyene compound is typically 1,000 or less, preferably 500 or less, and more preferably 300 or less. When the molecular weight of the conjugated polyene compound is greater than 1,000, the state of dispersion of the conjugated polyene compound in the resin composition may be inferior, and the appearance after the melt molding may be unfavorable. The lower limit of the content of the conjugated polyene compound in the resin composition is preferably 0.01 ppm, more preferably 0.1 ppm, still more preferably 0.5 ppm, and particularly preferably 1 ppm. The upper limit of the content is preferably 1,000 ppm, more preferably 800 ppm or less, and still more preferably 500 ppm or less. When the content of the conjugated polyene compound is less than the lower limit, the inhibitory effects on oxidative degradation in the melt molding may not be sufficiently achieved. On the other hand, when the content of the conjugated polyene compound is greater than the upper limit, the gelation of the resin composition may be facilitated.

Filler

Examples of the filler include glass fiber, wollastonite, calcium silicate, talc, montmorillonite, and the like.

Hydrotalcite

The hydrotalcite inhibits deterioration of the EVOH caused in the melt molding by a halogen ion present in the resin composition. A suitable hydrotalcite is exemplified by a hydrotalcite which is a double salt represented by $M_xAl_y(OH)_{2x+3y-2z}(R)_z \cdot aH_2O$, wherein M represents at least one element selected from the group consisting of Mg, Ca and Zn; R represents $CO_3$ or $HPO_4$; x, y and z is a positive number; and a is 0 or a positive number, and wherein a value of (2x+3y−2z) is greater than 0.

It is to be noted that in order to prevent generation of gels, one, or two or more types of the hydrotalcite compound, a hindered phenol compound, a hindered amine compound, and the like may be added in an amount of 0.01% by mass to 1% by mass.

Production Method of Resin Composition

The production method of the resin composition is not particularly limited as long as the EVOH (A), the PO (B) and carbonyl compound (C) can be homogeneously blended.

The procedure for homogeneously blending the carbonyl compound (C) into the resin composition at the specified content with respect to the resin content is exemplified by a procedure including the steps of:

(1) copolymerizing ethylene with a vinyl ester; and
(2) saponifying the copolymer obtained in the step (1).

The procedure for incorporating the specified amount of the carbonyl compound (C) into the resin composition is not particularly limited, and exemplified by:

a procedure in which the specified amount of the carbonyl compound (C) is added in the step (1);

a procedure in which the specified amount of the carbonyl compound (C) is added in the step (2);

a procedure in which the specified amount of the carbonyl compound (C) is added to the EVOH (A) obtained in the step (2);

a procedure in which the specified amount of the carbonyl compound (C) is added in blending the EVOH (A) obtained in the step (2) with the polyolefin (B);

a procedure in which the aforementioned procedures are employed in combination; and the like.

It is to be noted that when the procedure in which the specified amount of the carbonyl compound (C) is added in the step (1), or the procedure in which the specified amount of the carbonyl compound (C) is added in the step (2) is employed, it is necessary to add the specified amount of the carbonyl compound (C) within a range not leading to inhibition of the polymerization reaction in the step (1) and/or the saponification reaction in the step (2).

Of these procedures, in light of the ease of regulating the content of the carbonyl compound (C) in the resin composition, the procedure in which the specified amount of the carbonyl compound (C) is added to the EVOH (A) obtained in the step (2), and the procedure in which the specified amount of the carbonyl compound (C) is added in blending the EVOH (A) obtained in the step (2) with the polyolefin (B) are preferred, and the procedure in which the specified amount of the carbonyl compound (C) is added to the EVOH (A) obtained in the step (2) is more preferred.

The procedure for adding the specified amount of the carbonyl compound (C) to the EVOH (A) is exemplified by:

a procedure in which pelletizing is carried out after blending the carbonyl compound (C) with the EVOH (A) beforehand to give pellets;

a procedure in which a strand obtained by deposition of a paste after the saponification of the ethylene-vinyl ester copolymer is impregnated with the carbonyl compound (C);

a procedure in which a strand obtained by deposition is impregnated with the carbonyl compound (C) after cutting the strand;

a procedure in which the carbonyl compound (C) is added to a solution of redissolved chips of a dry resin composition;

a procedure in which a blend of two components of the EVOH (A) and the carbonyl compound (C) is melt-kneaded;

a procedure in which the carbonyl compound (C) is fed to be contained in a melt of the EVOH (A) during extrusion;

a procedure in which a masterbatch is produced by blending a high concentration of the carbonyl compound (C) with a part of the EVOH (A) and pelletizing the blend, and the masterbatch is dry-blended with the EVOH (A) to give a mixture which is then melt-kneaded; and the like.

Of these, in light of a possibility of more homogeneously dispersing a slight amount of the carbonyl compound (C) in the EVOH (A), the procedure in which pelletizing is carried out after blending the carbonyl compound (C) with the EVOH (A) beforehand to give pellets is preferred. Specifically, the carbonyl compound (C) is added to a solution prepared by dissolving the EVOH (A) in a good solvent such as a mixed solvent of water and methanol, and thus resulting mixture solution is extruded into a poor solvent through a nozzle or the like to permit deposition and/or coagulation, followed by washing and/or drying the same, whereby the pellets including the carbonyl compound (C) homogeneously mixed with the EVOH (A) can be obtained.

The resin composition can be obtained by, for example, mixing the EVOH containing the carbonyl compound (C) with the acid-modified polyolefin and/or the fatty acid metal salt by, for example, melt kneading each component using a melt kneading apparatus. The blending procedure is not particularly limited, and a ribbon blender, a high speed mixer, a cokneader, a mixing roll, an extruder, an intensive mixer and the like may be employed for the blending.

Of these, single screw or twin-screw extruders for use in melt blending a resin are generally most suitable as used in Examples. The order of addition is not particularly limited, and a procedure in which the EVOH containing the carbonyl compound (C), the PO (B) and the fatty acid metal salt are charged into an extruder simultaneously or in an appropriate order and melt kneaded is suitably employed. Alternatively, optional component(s) may be added during the melt kneading.

Multilayer Structure

The multilayer structure according to another aspect of the present invention is not particularly limited in terms of the layer structure and the total number of layers, the thickness and proportion of the layers, the type of a resin used in other layer, the presence or absence and the type of an adhesive resin, and the like, as long as at least one layer obtained by subjecting the resin composition described above to melt molding and a layer formed of other component are included.

The layer formed of other component preferably includes a layer formed of the ethylene-vinyl alcohol copolymer (A), or a layer formed of the polyolefin (B).

The polyolefin (B) constituting the layer formed of other component is exemplified by those exemplified in connection with the polyolefin (B) described above, and polypropylene-based resins such as polypropylenes and propylene-based copolymers, or polyethylene-based resins such as polyethylenes and ethylene-based copolymers are preferred.

The production method of the multilayer structure is not particularly limited, and is exemplified by an extrusion lamination process, a dry lamination process, an extrusion blow-molding process, a coextrusion lamination process, a coextrusion molding process, a coextrusion pipe molding process, a coextrusion blow-molding process, a coinjection molding process, a solution coating process, and the like. In light of versatility, the coextrusion molding and the coinjection molding are preferred. It is more preferred that when the coextrusion molding or the coinjection molding is carried out, the EVOH (A), the polyolefin (B), the other thermoplastic resin, the adhesive resin, and the like are each individually fed to separate thermoforming apparatuses.

Adhesive Resin

Each layer of the multilayer structure may be laminated via an adhesive resin, and a suitable adhesive resin for use in the adhesive resin layer is exemplified by the acid-modified polyolefin described above.

Production Method of Molded Article

The method for forming a molded article using the multilayer structure is exemplified by a vacuum forming process, a pressure forming process, a vacuum/pressure forming process, a blow-molding process, and the like. These forming/molding processes are typically carried out at a temperature falling within the range of the melting point of the EVOH (A) or below. Of these, the vacuum/pressure forming process is preferred. In the vacuum/pressure forming process, the multilayer structure is heated, and then formed using a combination of a vacuum and a compressed air. When the molded article is formed using the aforementioned multilayer structure through the vacuum/pressure forming process, the molded article can be easily and certainly produced, and consequently exhibit superior appearance characteristics and impact resistance.

The melt molding temperature may vary depending on the melting point of the EVOH (A), and the like, and is preferably about 150° C. to 250° C. When the molding temperature of the EVOH (A) is higher than 250° C., the heat deterioration of the EVOH may be accelerated, and the heat deterioration that occurs during repeated recovery and recycling of the EVOH (A) may lead to an unfavorable appearance of the molded article and the deterioration of the impact resistance thereof.

The extrusion-molding of each layer is carried out by operating an extruder provided with a single screw at a certain temperature. The temperature of an extruder for forming a barrier layer is adjusted to, for example, 170° C. to 210° C. The temperature of an extruder for forming the resin composition layer is adjusted to, for example, 200° C. to 240° C. The temperature of an extruder for forming the layer formed of other component is adjusted to, for example, 200° C. to 240° C. The temperature of an extruder for forming the adhesive layer is adjusted to, for example, 160° C. to 220° C.

Moreover, the multilayer structure may be subjected to a secondary processing to attain an intended shape. The secondary processing is exemplified by a stretching process, a thermoforming process, a blow-molding process, and the like. Examples of the stretching process include a roll stretching process, a tenter stretching process, a tubular stretching process, a stretching blow process, and the like. In a case where biaxially stretching is carried out, any of simultaneous biaxial stretching and sequential biaxial stretching may be employed. Examples of the thermoforming process include a process that involves forming the multilayer structure in a film or sheet form into a cup or tray form by vacuum forming, pressure forming, vacuum/pressure forming or the like. Moreover, examples of the blow-molding process include a process that involves blowing the multilayer structure in the form of a parison to form a bottle or a tube.

The molded article obtained through the melt molding or the like may be further subjected to a secondary forming processing such as bending processing, vacuum forming, blow-molding and press molding, as needed, to obtain an intended molded article.

Since the molded article includes the layer formed from the resin composition having the aforementioned properties, the molded article can be suitably used for thermoformed containers, for example, food packaging containers or fuel containers.

The thermoformed container including the multilayer structure according to the embodiment of the present invention can be formed as a container by forming the multilayer structure according to a purpose, followed by heat sealing as needed, and used for transportation and/or storage after filling the container with contents. The contents may be either foods or non-foods, and may be dry, wet, or oily. In addition, the container including the multilayer structure may be subjected to a boiling treatment or a retort treatment. In a case where the container is subjected to such a treatment, a container having the layer formed of the polyolefin (B) as the outermost layer on both sides, or a container having a thick EVOH layer is suitably used.

EXAMPLES

Hereinafter, the present invention is specifically explained by way of Examples, but the present invention is not in anyhow limited to these Examples. It is to be noted that each quantitative determination in these Examples was carried out using the following method.

(1) Determination of Moisture Content of Hydrous EVOH Pellets

The moisture content of hydrous EVOH pellets was determined under conditions involving a drying temperature of 180° C., a drying time period of 20 min and a sample amount of about 10 g using a halogen moisture analyzer "HR73" available from Mettler-Toledo International Inc. The moisture content of the hydrous EVOH set forth in the following is expressed in % by mass with respect to the mass of the dry EVOH.

(2) Ethylene Content and Degree of Saponification of EVOH (A)

The determination was made based on $^1$H-NMR recorded on a nuclear magnetic resonance apparatus (nuclear magnetic resonance apparatus with a superconducting magnet, "Lambda500", manufactured by JEOL, Ltd.) using DMSO-$d_6$ as a solvent for measurement.

(3) Quantitative Determination of Carbonyl Compound (C)

A DNPH solution was prepared by adding 50 mL of 1,1,1,3,3,3-hexafluoroisopropanol (HFIP), 11.5 mL of acetic acid and 8 mL of ion exchanged water to 200 mg of a 50% by mass aqueous solution of 2,4-dinitrophenylhydrazine (DNPH). Sample pellets in an amount of 1 g were added to 20 mL of the DNPH solution, and dissolved at 35° C. for 1 hour with stirring. Acetonitrile was added to this solution to permit precipitation and sedimentation of the resin content, followed by filtration, and the resulting solution was concentrated, whereby an extraction sample was obtained. This extraction sample was analyzed for quantitative determination by high performance liquid chromatography under the following conditions, whereby the carbonyl compound (C) was quantitatively determined. It is to be noted that in the quantitative determination, a calibration curve created using an authentic sample prepared by reacting each carbonyl compound (C) with the prepared DNPH solution was used.

Measurement Conditions
 column: TSKgel ODS-80 Ts (manufactured by Tosoh Corporation)
 mobile phase: water/acetonitrile=52:48 (volume ratio)
 detector: photodiode array detector (360 nm)

(4) Quantitative Determination of Conjugated Polyene Compound

Dry resin composition pellets were ground by freeze grinding, and 10 g of the ground matter obtained by eliminating coarse particles using a sieve having a nominal dimension of 0.150 mm (100 mesh, according to JIS Z8801-1 to 3) was packed into a Soxhlet extraction apparatus, and an extraction treatment was executed using 100 mL of chloroform for 48 hours. This extraction liquid was analyzed for quantitative determination by high performance liquid chromatography to quantitatively determine the amount of the conjugated polyene compound. It is to be noted that in the quantitative determination, a calibration curve created using an authentic sample of each conjugated polyene compound was used.

(5) Odor in Molding

The odor in molding was evaluated according to the following conditions. Into a 100 mL glass sample tube were charged 20 g of sample pellets of the resin composition, and the opening of the sample tube was covered with an aluminum foil lid. Then, the sample tube was heated in a hot-air dryer at 220° C. for 30 min. The sample tube was taken out from the dryer and allowed to cool at room temperature for 30 min. Thereafter, the sample tube was shaken two or three times, and checked for odor after removing the aluminum foil lid. The intensity of the odor of the sample pellets was evaluated according to the following criteria.

A: an odor not being recognized;
B: an odor being slightly recognized; and
C: an odor being clearly recognized.

(6) Quantitative Determination of Aliphatic Carboxylic Acid (Fatty Acid Salt and Aliphatic Carboxylic Acid Ion)

Dry EVOH pellets, the resin composition or a recovered resin composition were/was ground by freeze grinding. Thus resulting ground matter was sieved with a sieve having a nominal dimension of 1 mm (according to normal sieve standard JIS Z8801-1 to 3). Ten grams of the ground matter powder having passed the sieve and 50 mL of ion exchanged water were charged into a stoppered 100 mL Erlenmeyer flask, and stirred at 95° C. for 10 hours after the stoppered Erlenmeyer flask was equipped with a cooling condenser. Two mL of the resulting solution was diluted with 8 mL of ion exchanged water. The amount of the carboxylic acid ion in the diluted solution was quantitatively determined using an ion chromatograph "ICS-1500" manufactured by Yokogawa Electric Corporation according to the following measurement conditions, whereby the amount of the aliphatic carboxylic acid (and aliphatic carboxylic acid ion) was calculated. It is to be noted that in the quantitative determination, a calibration curve created using each carboxylic acid was used.

Measurement Conditions
 column: IonPAC ICE-AS1 (9φ×250 mm, manufactured by DIONEX; detector: electric conductivity detector)
 eluent: 1.0 mmol/L aqueous octanesulfonic acid solution;
 measurement temperature: 35° C.;
 eluent flow rate: 1 mL/min; and
 amount used for the analysis: 50 μL.

(7) Quantitative Determination of Metal Ion

Into a fluorocarbon resin pressure container available from Actac Project Services Corporation were/was charged 0.5 g of dry EVOH pellets, the resin composition or the recovered resin composition (E) described later, and 5 mL of nitric acid for accurate analysis available from Wako Pure Chemical Industries, Ltd. was further added thereto. After the pressure container was left to stand for 30 min, the container was closed with a cap lip having a rupture disk, and a treatment was carried out at 150° C. for 10 min, and then at 180° C. for 10 min using a microwave high speed degradation system "speedwave MWS-2" available from Actac Project Services Corporation, whereby the resin was decomposed. In a case where the decomposition of the resin was incomplete, the treatment conditions were appropriately adjusted. The resulting decomposition product was diluted with 10 mL of ion exchanged water, all the liquid was transferred to a 50 mL volumetric flask, and the volume of the liquid was adjusted to 50 mL with ion exchanged water, whereby a decomposition product solution was prepared.

The decomposition product solution thus obtained was subjected to a quantitative determination analysis at the measurement wavelengths set forth below using an ICP optical emission spectrophotometer "Optima 4300 DV" available from PerkinElmer Japan Co., Ltd., whereby the amounts of the metal ion, the phosphate compound and the boron compound were quantitatively determined. The amount of the phosphate compound was calculated as a mass in terms of phosphorus element equivalent after the quantitative determination of the phosphorus element. The content of the boron compound was calculated as a mass in terms of boron element equivalent.

Na: 589.592 nm;
K: 766.490 nm;
Mg: 285.213 nm;
Ca: 317.933 nm;
P: 214.914 nm;
B: 249.667 nm;
Si: 251.611 nm;
Al: 396.153 nm;
Zr: 343.823 nm;
Ce: 413.764 nm;
W: 207.912 nm; and
Mo: 202.031 nm.

Synthesis of EVOH

Synthesis Example

Using a 250 L pressure reactor, the polymerization was carried out under the following conditions to synthesize ethylene-vinyl acetate copolymer.
vinyl acetate: 83.0 kg,
methanol: 26.6 kg,
feed rate of 2,2'-azobis(4-methoxy-2,4-dimethylvaleronitrile) (2.5 g/L methanol solution): 1,119.5 mL/hr
polymerization temperature: 60° C.
pressure of ethylene in polymerization tank: 3.6 MPa
polymerization time period: 5.0 hours The conversion of vinyl acetate in the resulting copolymer was about 40%. After sorbic acid was added to this copolymerization reaction mixture, the reaction mixture was supplied to a purge tower, and unreacted vinyl acetate was eliminated from the top of the tower by introducing methanol vapor from the bottom of the tower, whereby a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was further added methanol to adjust the copolymer concentration to 20% by mass. The temperature of this solution was elevated to 60° C., and the reaction was allowed while blowing nitrogen gas into the reactor for about 4 hours. This solution was then extruded into water from a die plate provided with a circular opening to permit deposition of the EVOH (A), followed by cutting to give pellets having a diameter of about 3 mm and a length of about 5 mm. The pellets were subjected to deliquoring using a centrifugal separator, and an operation of further adding a large amount of water thereto, and deliquoring the pellets was repeated.

Preparation of EVOH Containing Carbonyl Compound (C)

Twenty kg of the deliquored pellets were added to 180 kg of a mixed solvent of water and methanol (mass ratio: water/methanol=40/60), and the mixture was stirred at 60° C. for 6 hours to completely dissolve the pellets. To the solution thus obtained was added the carbonyl compound (C), and this mixture was further stirred for 1 hour such that the carbonyl compound (C) was completely dissolved, whereby an EVOH solution was obtained. This solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous chips of the EVOH containing the carbonyl compound (C). The resulting porous EVOH chips were washed with an aqueous acetic acid solution and ion exchanged water. The EVOH chips were separated from the washing liquid, followed by deliquoring, and thereafter were dried in a hot-air dryer at 80° C. for 4 hours, and further at 100° C. for 16 hours to obtain pellets. The content of each component in the resulting EVOH containing the carbonyl compound (C) was quantitatively determined according to the method described above.

Preparation of Resin Composition

Examples 1-1 to 1-5, 2-1 to 2-5, and 3-1 to 3-5;
Comparative Examples 1-1, 1-2, 2-1, 2-2, 3-1, and 3-2

A mixture was obtained by mixing 5.5 parts of the EVOH containing the carbonyl compound (C), 87 parts of polyethylene (HZ8200B manufactured by Prime Polymer Co., Ltd.; hereinafter, may be also referred to as "HDPE") as the polyolefin (B), 7.5 parts of the acid-modified polyolefin (D) (Admer GT-6A manufactured by Mitsui Chemicals, Inc.; hereinafter, may be also referred to as "AD") and 0.15 parts of the fatty acid metal salt, and adding the carbonyl compound (C) thereto as needed. The mixture was subjected to melt kneading under the pelletizing conditions set forth below, whereby 20 kg of each resin composition (hereinafter, may be also referred to as "recovered resin composition (E)") having the compounding formulation shown in Tables 1 to 3 was obtained. An operation of subjecting the resin composition thus obtained to melt kneading again and removing the resin composition from the kneading machine was repeated, and 20 kg of recovered resin compositions (E) obtained after subjecting to the melt kneading procedure repeated 5 and 10 times (hereinafter, (the number of) times of the repeated melt kneading procedure being referred to as "(number of) recovery times") were each obtained. It is to be noted that the melt kneading temperature of the recovered resin composition (E) was 250° C., which was higher than the typical kneading temperature of about 150° C. to 250° C. under typical EVOH kneading condition. The content of the carbonyl compound (C) was quantitatively determined according to the method described above. In addition, the content of the fatty acid metal salt was determined based on the mass thereof in the preparation of the mixture.

Pelletizing Conditions
extruder: twin-screw extruder "Laboplast Mill" available from Toyo Seiki Seisaku-sho, Ltd.
screw diameter: 25 mmφ
screw rotation speed: 100 rpm
feeder rotation speed: 100 rpm
temperature settings of cylinders and die: C1/C2/C3/C4/C5/D=180° C./230° C./250° C./250° C./250° C./250° C.

Production of Multilayer Structure

The EVOH (A) having been deliquored and then dried, the polyolefin (B) (polyethylene), the carboxylic acid-modified polyolefin (D) ("QF-500" available from Mitsui Chemicals Admer, Inc.), and the recovered resin composition (E) were charged into separate extruders of a coextrusion molding apparatus, and a multilayer sheet having the entire layer thickness of 1,000 μm and having 6 layers involving 4 types, with a layer structure of: polyolefin (B) layer 300 μm/carboxylic acid-modified polyolefin (D) 50 μm/EVOH (A) layer 50 μm/carboxylic acid-modified polyolefin (D) 50 μm/recovered resin composition (E) layer 400 μm/polyolefin (B) layer 150 μm was produced.

Each Extruder and Extrusion Condition extruder for EVOH (A) having been deliquored and then dried: single screw, diameter of 40 mm, L/D=26, temperature of 170° C. to 210° C.

extruder for polyolefin (B): single screw, screw diameter of 40 mm, L/D=22, temperature of 160° C. to 210° C.

extruder for recovered resin composition (E): single screw, diameter of 65 mm, L/D=22, temperature of 200° C. to 240° C.

extruder for carboxylic acid-modified polyolefin (D): single screw, diameter of 40 mm, L/D=26, temperature of 160° C. to 220° C.

Molding Conditions of Coextrusion Sheet Molding Apparatus feed block die (width: 600 mm); temperature: 255° C.

Production of Thermoformed Container

The multilayer sheet obtained using the coextrusion molding apparatus (sampled at 30 min and 24 hours from the starting of the coextrusion molding apparatus) was cut into a 15 cm square piece, and the piece was subjected to thermoforming (compressed air: 5 kg/cm², plug: 45φ×65 mm; syntax form; plug temperature: 150° C.; die temperature: 70° C.) using a batch-wise thermoforming and testing machine available from Asano Laboratories Co. Ltd. under a condition involving a sheet temperature of 150° C. so as to give a cup shape (die shape: 70φ×70 mm; draw ratio (S): 1.0), whereby a thermoformed container was produced.

Production of Blow-Molded Container

Examples 1-1 to 1-5, 2-1 to 2-5, and 3-1 to 3-5; Comparative Examples 1-1, 1-2, 2-1, 2-2, 3-1, and 3-2

Using the EVOH (A) having been deliquored and then dried, a polyethylene resin (HZ8200B, manufactured by Prime Polymer Co., Ltd.), an adhesive resin (Admer GT-6A, manufactured by Mitsui Chemicals, Inc.) and the recovered resin composition (E), a 3-L blow-molded container of 6 layers involving 4 types, i.e., polyolefin (B) layer 240 μm/adhesive resin (D) layer 40 μm/EVOH (A) layer 40 μm/adhesive resin (D) layer 40 μm/recovered resin composition (E) layer 100 μm/polyolefin (B) layer 240 μm, from the inside to the outside, with the entire layer thickness of 700 μm was formed in a blow-molding machine TB-ST-6P manufactured by Suzuki Seiko Co., Ltd. at 210° C., with cooling at an internal temperature of the die of 15° C. for 20 sec. The diameter of the bottom face of the container was 100 mm, and the height thereof was 400 mm. In this process, recovered resin compositions (E) obtained through 1, 5 and 10 recovery time(s) were each used as the recovered resin composition (E).

(8) Evaluation of Blow-Molded Container

Evaluation of Appearance

On a 3-L container formed by using the recovered resin composition (E) obtained through 10 recovery times for the recovered resin composition (E) layer, and subjecting the recovered resin composition (E) thus obtained to blow-molding, streaks and coloring were evaluated by a visual inspection in accordance with the following criteria, whereby the appearance characteristics were evaluated.

Evaluation Criteria of Streaks

"favorable (A)": no streaks found;

"somewhat favorable (B)": streaks found; and

"unfavorable (C)": a large number of streaks found.

Evaluation Criteria of Coloring

"favorable (A)": colorless;

"somewhat favorable (B)": yellowed; and

"unfavorable (C)": significantly yellowed.

Evaluation of Impact Resistance

Into the 3-L containers formed by blow-molding using the recovered resin composition (E) layer, the recovered resin compositions (E) obtained through 1, 5, and 10 recovery times was charged 2.5 L of propylene glycol, and the opening was capped by heat sealing using a film having a construction of polyethylene 40 μm/aluminum foil 12 μm/polyethylene terephthalate 12 μm. The container was cooled at −40° C. for 3 days, and thereafter dropped from a height of 6 m with the opening of the 3-L container facing upward. The impact resistance was evaluated in accordance with the number of broken containers (n=10).

Evaluation Criteria of Impact Resistance:

"favorable (A)": less than 3;

"somewhat favorable (B)": 3 to less than 6; and

"unfavorable (C)": 6 or greater.

(9) Diameter of Dispersed Particles of EVOH Contained in Recovered Resin Composition (E) Layer The blow-molded container was carefully cut along a direction perpendicular to the lateral face of the container with a microtome, and then the recovered resin composition (E) layer was taken with a scalpel. Platinum was vapor-deposited the exposed cross section under a vacuum atmosphere. A photograph of the cross section on which platinum was vapor-deposited was taken using a scanning electron microscope (SEM) at a magnification of ×10,000. A region containing about 20 particles of the EVOH was selected on this photograph, and the diameters of the particle images found in this region were measured. An average of the measurements was calculated and designated as "diameter of dispersed particles". It is to be noted that with respect to the particle diameter of each particle, the longitudinal diameter (i.e., the longest span) of each particle found in the photograph was measured, and this value was designated as the particle diameter of the particle. In addition, the film or the sheet was cut perpendicularly to the extrusion direction, and the photograph was taken along a direction perpendicular to the cross section.

Evaluation Criteria of Average Diameter of Dispersed Particles

"favorable (A)": less than 1.5 μm;

"somewhat favorable (B)": less than 2.5 μm;

"unfavorable (C)": 2.5 μm or greater.

TABLE 1

| | Resin composition (E) | | | | | | | | |
|---|---|---|---|---|---|---|---|---|---|
| | EVOH (A) | polyolefin (B) | | carbonyl compound (C) | | acid-modified polyolefin (D) | | fatty acid metal salt | |
| | parts | type | parts | type | ppm | type | parts | type | parts |
| Example 1-1 | 5.5 | HDPE | 87 | crotonaldehyde | 0.3 | AD | 7.5 | zinc stearate | 0.15 |
| Example 1-2 | 5.5 | HDPE | 87 | crotonaldehyde | 35 | AD | 7.5 | zinc stearate | 0.15 |
| Example 1-3 | 5.5 | HDPE | 87 | crotonaldehyde | 3 | AD | 7.5 | zinc stearate | 0.15 |
| Example 1-4 | 5.5 | HDPE | 87 | 2,4-hexadienal | 0.3 | AD | 7.5 | calcium stearate | 0.3 |
| Example 1-5 | 5.5 | HDPE | 87 | 2,4,6-octatrienal | 0.3 | AD | 7.5 | calcium stearate | 0.3 |
| Comparative Example 1-1 | 5.5 | HDPE | 87 | crotonaldehyde | N.D. | AD | 7.5 | zinc stearate | 0.15 |
| Comparative Example 1-2 | 5.5 | HDPE | 87 | crotonaldehyde | 500 | AD | 7.5 | zinc stearate | 0.15 |

| | Evaluations | | | | | | | | |
|---|---|---|---|---|---|---|---|---|---|
| | | number of recovery times of 1 | | number of recovery times of 5 | | number of recovery times of 10 | | | |
| | odor in molding | diameter of dispersed particles | impact resistance | diameter of dispersed particles | impact resistance | appearance streaks | coloring | diameter of dispersed particles | impact resistance |
| Example 1-1 | A | A | A | A | A | A | A | A | A |
| Example 1-2 | B | A | A | A | A | A | B | B | B |
| Example 1-3 | B | A | A | A | A | A | B | A | A |
| Example 1-4 | A | A | A | A | A | A | A | B | B |
| Example 1-5 | B | A | A | A | A | A | B | B | B |
| Comparative Example 1-1 | C | A | A | C | C | C | C | C | C |
| Comparative Example 1-2 | C | A | A | B | B | C | C | C | C |

HPDE: HZ8200B manufactured by Prime Polymer Co., Ltd.
AD: Admer GT-6A manufactured by Mitsui Chemicals, Inc.
N.D.: less than 0.01 ppm

TABLE 2

| | Resin composition (E) | | | | | | | | |
|---|---|---|---|---|---|---|---|---|---|
| | EVOH (A) | polyolefin (B) | | carbonyl compound (C) | | acid-modified polyolefin (D) | | fatty acid metal salt | |
| | parts | type | parts | type | ppm | type | parts | type | parts |
| Example 2-1 | 5.5 | HDPE | 87 | propanal | 0.3 | AD | 7.5 | zinc stearate | 0.15 |
| Example 2-2 | 5.5 | HDPE | 87 | propanal | 35 | AD | 7.5 | zinc stearate | 0.15 |
| Example 2-3 | 5.5 | HDPE | 87 | propanal | 3 | AD | 7.5 | zinc stearate | 0.15 |
| Example 2-4 | 5.5 | HDPE | 87 | butanal | 35 | AD | 7.5 | calcium stearate | 0.3 |
| Example 2-5 | 5.5 | HDPE | 87 | hexanal | 35 | AD | 7.5 | calcium stearate | 0.3 |
| Comparative Example 2-1 | 5.5 | HDPE | 87 | propanal | N.D. | AD | 7.5 | zinc stearate | 0.15 |
| Comparative Example 2-2 | 5.5 | HDPE | 87 | propanal | 500 | AD | 7.5 | zinc stearate | 0.15 |

| | Evaluations | | | | | | | | |
|---|---|---|---|---|---|---|---|---|---|
| | | number of recovery times of 1 | | number of recovery times of 5 | | number of recovery times of 10 | | | |
| | odor in molding | diameter of dispersed particles | impact resistance | diameter of dispersed particles | impact resistance | appearance streaks | coloring | diameter of dispersed particles | impact resistance |
| Example 2-1 | A | A | A | A | A | A | A | A | A |
| Example 2-2 | B | A | A | A | A | A | B | B | B |

TABLE 2-continued

|  | | | | | | | | | |
|---|---|---|---|---|---|---|---|---|---|
| Example 2-3 | A | A | A | A | A | A | B | A | A |
| Example 2-4 | B | A | A | A | A | A | A | B | B |
| Example 2-5 | B | A | A | A | A | A | B | B | B |
| Comparative Example 2-1 | C | A | A | C | C | C | C | C | C |
| Comparative Example 2-2 | C | A | A | B | B | C | C | C | C |

HPDE: HZ8200B manufactured by Prime Polymer Co., Ltd.
AD: Admer GT-6A manufactured by Mitsui Chemicals, Inc.
N.D.: less than 0.01 ppm

TABLE 3

| | Resin composition (E) | | | | | | | | |
|---|---|---|---|---|---|---|---|---|---|
| | EVOH (A) | polyolefin (B) | | carbonyl compound (C) | | acid-modified polyolefin (D) | | fatty acid metal salt | |
| | parts | type | parts | type | ppm | type | parts | type | parts |
| Example 3-1 | 5.5 | HDPE | 87 | acetone | 0.3 | AD | 7.5 | zinc stearate | 0.15 |
| Example 3-2 | 5.5 | HDPE | 87 | acetone | 35 | AD | 7.5 | zinc stearate | 0.15 |
| Example 3-3 | 5.5 | HDPE | 87 | acetone | 3 | AD | 7.5 | zinc stearate | 0.15 |
| Example 3-4 | 5.5 | HDPE | 87 | methyl ethyl ketone | 0.3 | AD | 7.5 | calcium stearate | 0.3 |
| Example 3-5 | 5.5 | HDPE | 87 | 2-hexanone | 0.3 | AD | 7.5 | calcium stearate | 0.3 |
| Comparative Example 3-1 | 5.5 | HDPE | 87 | acetone | N.D. | AD | 7.5 | zinc stearate | 0.15 |
| Comparative Example 3-2 | 5.5 | HDPE | 87 | acetone | 500 | AD | 7.5 | zinc stearate | 0.15 |

| | Evaluations | | | | | | | | |
|---|---|---|---|---|---|---|---|---|---|
| | | number of recovery times of 1 | | number of recovery times of 5 | | number of recovery times of 10 | | | |
| | odor in molding | diameter of dispersed particles | impact resistance | diameter of dispersed particles | impact resistance | appearance | | diameter of dispersed particles | impact resistance |
| | | | | | | streaks | coloring | | |
| Example 3-1 | A | A | A | A | A | A | A | A | A |
| Example 3-2 | A | A | A | A | A | A | B | B | B |
| Example 3-3 | A | A | A | A | A | A | B | A | A |
| Example 3-4 | B | A | A | A | A | A | A | B | B |
| Example 3-5 | B | A | A | A | A | A | B | B | B |
| Comparative Example 3-1 | C | A | A | C | C | C | C | C | C |
| Comparative Example 3-2 | C | A | A | B | B | C | C | C | C |

HPDE: HZ8200B manufactured by Prime Polymer Co., Ltd.
AD: Admer GT-6A manufactured by Mitsui Chemicals, Inc.
N.D.: less than 0.01 ppm As shown in Tables 1 to 3, it was found that the blow-molded container according to the embodiment of the present invention exhibited inhibited coloring and generation of the streaks as well as superior appearance characteristics as compared with the blow-molded containers of Comparative Examples. In addition, in regard to the blow-molded container according to the embodiment of the present invention, the multilayered container including the recovered resin composition (E) obtained through 10-repeated recovery times exhibited superior impact resistance. It was found that due to the use of the resin composition that was superior in recovery-repeatability, the blow-molded container according to the embodiment of the present invention achieved the effects that: an increase of the viscosity due to heat deterioration of the EVOH component after repeated recoveries was inhibited; thus, the aggregation of the EVOH component in the recovered resin composition (E) was inhibited; and accordingly the deterioration of the impact resistance was prevented.

INDUSTRIAL APPLICABILITY

The present invention can provide a resin composition and a thermoformed container that exhibit inhibited generation of defects in the thermoforming and have a superior appearance and sufficient strength. Moreover, when a recovered resin composition obtained by repeatedly recovering a remnant, a scrap and the like of the sheet containing the resin composition is used in a layer of a multilayer structure, the heat deterioration and aggregation of the EVOH in the recovered resin composition is less likely to occur, the compatibility with other thermoplastic resin is less likely to be deteriorated, and the deterioration of the impact resistance of the resulting multilayered container can be inhibited. Therefore, the resin composition, the multilayer structure and the molded article described above are suitable for molding materials for various types of packaging materials such as food packaging materials and fuel containers.

The invention claimed is:

1. A resin composition, comprising:
   (A) an ethylene-vinyl alcohol copolymer (A);
   (B) a polyolefin (B); and
   (C) a carbonyl compound (C) having 3 to 8 carbon atoms, wherein:
   the carbonyl compound (C) is a saturated aldehyde (C-2), a saturated ketone (C-3) or a combination thereof; and
   a content of the carbonyl compound (C) is 0.01 ppm or greater and 100 ppm or less.

2. The resin composition according to claim 1, wherein:
   the carbonyl compound (C) comprises the saturated aldehyde (C-2); and
   the saturated aldehyde (C-2) is selected from the group consisting of propanal, butanal and hexanal.

3. The resin composition according to claim 1, wherein:
   the carbonyl compound (C) comprises the saturated ketone (C-3); and
   the saturated ketone (C-3) is selected from the group consisting of acetone, methyl ethyl ketone and 2-hexanone.

4. The resin composition according to claim 1, further comprising:
   an acid-modified polyolefin.

5. The resin composition according to claim 1, further comprising:
   a fatty acid metal salt.

6. The resin composition according to claim 5, wherein a content of the fatty acid metal salt is 50 ppm or greater and 4,000 ppm or less.

7. A multilayer structure, comprising a layer formed of the resin composition according to claim 1 and a layer formed of other component.

8. The multilayer structure according to claim 7, wherein the layer formed of other component comprises a layer formed of the ethylene-vinyl alcohol copolymer (A) and a layer formed of the polyolefin (B).

9. The multilayer structure according to claim 7, wherein an average diameter of dispersed particles of the ethylene-vinyl alcohol copolymer (A) in the layer formed of the resin composition is less than 2.5 μm.

10. A thermoformed container, comprising the multilayer structure according to claim 7.

11. The thermoformed container according to claim 10, which is a blow-molded product.

12. A method for producing a thermoformed container, the method, comprising:
    thermoforming the multilayer structure according to claim 7.

13. The method for producing a thermoformed container according to claim 12, wherein the thermoforming is blow-molding.

* * * * *